US009600517B2

(12) United States Patent
Ma et al.

(10) Patent No.: US 9,600,517 B2
(45) Date of Patent: Mar. 21, 2017

(54) CONVERT COMMAND INTO A BULK LOAD OPERATION

(71) Applicants: Xiaobin Ma, Fremont, CA (US); Srinivasan Mottupalli, Bangalore (IN); Peter Schneider, Dublin, CA (US)

(72) Inventors: Xiaobin Ma, Fremont, CA (US); Srinivasan Mottupalli, Bangalore (IN); Peter Schneider, Dublin, CA (US)

(73) Assignee: SYBASE, INC., Dublin, CA (US)

( * ) Notice: Subject to any disclaimer, the term of this patent is extended or adjusted under 35 U.S.C. 154(b) by 187 days.

(21) Appl. No.: 14/290,013

(22) Filed: May 29, 2014

(65) Prior Publication Data

US 2015/0347409 A1   Dec. 3, 2015

(51) Int. Cl.
*G06F 17/30* (2006.01)

(52) U.S. Cl.
CPC .................. *G06F 17/3038* (2013.01)

(58) Field of Classification Search
CPC ................ G06F 17/30; G06F 17/3038; G06F 17/30315; G06F 17/30339
See application file for complete search history.

(56) References Cited

U.S. PATENT DOCUMENTS

| 5,644,763 | A | 7/1997 | Roy |
|---|---|---|---|
| 7,089,249 | B2 | 8/2006 | Kobayashi et al. |
| 7,305,410 | B2 | 12/2007 | Skopec |
| 7,337,176 | B1 | 2/2008 | Cheedella et al. |
| 7,346,702 | B2 | 3/2008 | Haviv |
| 7,421,440 | B2 | 9/2008 | Pereira |
| 7,555,493 | B2 | 6/2009 | Khayter et al. |
| 7,716,085 | B2 | 5/2010 | Stier |
| 7,895,151 | B2 | 2/2011 | Shau |
| 7,953,712 | B2 | 5/2011 | Steinmaier et al. |
| 8,078,646 | B2 | 12/2011 | Das |
| 8,468,151 | B2 | 6/2013 | Branscome et al. |
| 8,583,696 | B2 | 11/2013 | Jhingan |
| 8,782,101 | B1 | 7/2014 | Moore |
| 2003/0028506 | A1 | 2/2003 | Yu |
| 2004/0181510 | A1* | 9/2004 | Jardin ............... G06F 17/30339 |

(Continued)

OTHER PUBLICATIONS

"U.S. Appl. No. 14/289,994, Final Office Action mailed Jul. 25, 2016", 13 pgs.

(Continued)

*Primary Examiner* — Usmaan Saeed
*Assistant Examiner* — William P Bartlett
(74) *Attorney, Agent, or Firm* — Schwegman Lundberg & Woessner, P.A.

(57) ABSTRACT

A method for inserting rows into a target table can include receiving a database command, the database command associated with a base table with at least one row to copy to a target table; receiving an indication that use of a BULK insert mode is feasible for the database command; based on the indication, and determining that an insert mode for the database command has been converted from a non-bulk insert mode to the BULK insert mode: reading a row from the base table; building the row read from the base table into an allocated row buffer; inserting the row into the target table in the BULK insert mode; and if it is determined that the allocated row buffer is full, updating at least one index in parallel with the inserting.

20 Claims, 5 Drawing Sheets

(56) References Cited

U.S. PATENT DOCUMENTS

| | | |
|---|---|---|
| 2006/0047717 A1 | 3/2006 | Pereira |
| 2008/0104102 A1* | 5/2008 | Zhang ............... G06F 17/30336 |
| 2008/0319967 A1 | 12/2008 | Hutchison et al. |
| 2010/0293209 A1* | 11/2010 | Bireley ............. G06F 17/30418 707/718 |
| 2012/0197866 A1* | 8/2012 | Xu .................... G06F 17/30412 707/713 |
| 2012/0239612 A1 | 9/2012 | George et al. |
| 2012/0259843 A1 | 10/2012 | Child |
| 2012/0317128 A1* | 12/2012 | Park .................. G06F 17/30386 707/752 |
| 2014/0222872 A1* | 8/2014 | Rambo ............. G06F 17/30345 707/803 |
| 2015/0213071 A1 | 7/2015 | Alvey et al. |
| 2015/0347470 A1 | 12/2015 | Ma et al. |

OTHER PUBLICATIONS

"U.S. Appl. No. 14/289,994, Non Final Office Action mailed Feb. 10, 2016", 13 pgs.

"U.S. Appl. No. 14/289,994, Notice of Allowance mailed Nov. 30, 2016", 9 pgs.

"U.S. Appl. No. 14/289,994, Response filed Apr. 28, 2016 to Non Final office action mailed Feb. 10, 2016", 12 pgs.

"U.S. Appl. No. 14/289,994, Response filed Oct. 18, 2016 to Final Office Action mailed Jul. 25, 2016", 13 pgs.

U.S. Appl. No. 14/289,994, filed May 29, 2014, Run-Time Decision of Bulk Insert for Massive Data Loading.

* cited by examiner

CONVERT COMMAND INTO A BULK LOAD OPERATION

RELATED-APPLICATIONS

This application is related to application Ser. No. 14/289,994 titled "Run-Time Decision Of Bulk Insert For Massive Data Loading" filed on May 29, 2014, the entirety of which is hereby incorporated by reference.

TECHNICAL FIELD

Embodiments described herein generally relate to database command execution and in particular, but not limited to, converting a command into a bulk load operation.

BACKGROUND

Various types of databases are used to store and retrieve data. For example, a relational database is organized as tables with each table capable of having zero or more rows of data. One or more columns in a table can be designated as a primary key (e.g., a unique value for the row). The data in one table can have a relation to another table by relating a column in one table to one of the primary key columns in a second table. Each table can also have one or more associated indexes.

A database index is a subset of a table, such as the primary key, that can be used to search for the existence of a row rather than searching the entire table. At the storage device level, pages are used to store data of a database. For example, rows of a database are stored as data pages of fixed size (e.g., each table can have multiple data pages) whereas indexes can be stored as index pages. Groups of pages are called extents.

A relational database management system (RDBMS) can include software that can be used to manage a relational database. Typically, Structured Query Language (SQL) is the programming language that is used to create, read, update, and delete (CRUD) data stored in the tables of a database. An SQL command can be considered a query.

One common task in data warehouse environments using relational databases is large-scale loading and merging of data across tables. The data can be loaded in the data warehouse through SQL queries such as INSERT INTO . . . SELECT or MERGE INTO statements. In various examples, while loading the data, the indexes defined on the target table of these SQL statements should be updated at the same time in order to maintain the data integrity and keep the indexes useful in subsequent queries. However, existing approaches insert the rows one-by-one and update the indexes for each row in a non-BULK insert mode. For large data loading, using serial inserts can be an inefficient approach.

BRIEF DESCRIPTION OF THE DRAWINGS

In the drawings, which are not necessarily drawn to scale, like numerals can describe similar components in different views. Like numerals having different letter suffixes can represent different instances of similar components. Some embodiments are illustrated by way of example, and not limitation, in the figures of the accompanying drawings in which.

DETAILED DESCRIPTION

For large data loading, using serial inserts via traditional non-BULK insert can be an inefficient approach. For example, the insertion into data pages and update of the indexes are separate operations in a non-BULK insert. Once the newly inserted row is available, the threads can proceed in parallel in separate threads, but it is still inefficient if each thread handles one row at a time. One inefficiency can occur after an index update thread finishes its own work, because the thread has to wait for the main thread to read a row from the underlying table and prepare the row for the thread. For example, in a non-BULK insert mode, each row is copied into a fixed buffer of one row size and then inserted into a data page for the target table. After the row is inserted, the RDBMS scans all indexes and updates the indexes one-by-one with the newly inserted rows in a serial mode. This process is repeated until all the rows are inserted into data pages and all indexes are updated. In other words, time and resources can be wasted even when using multiple threads to insert data and update indexes in parallel.

In order to address some of the inefficiencies above, various embodiments convert the serial inserts of the non-BULK mode to the BULK insert mode. Embodiments can use a BULK insert mode, where rows from a base table (e.g., the table that rows are copied from) are built into a data page for the target table. As the rows are built into the data page, the page fills up and the page is handed off directly to a database store layer and written to disk. While writing the whole data page to disk, parallel index update threads, one of which is responsible for one index update, takes the data page and updates the corresponding indexes in parallel.

BULK loading can differ from non-BULK loading in a few ways. For example, in a non-BULK insert mode, each row can be copied into a fixed buffer of one row size and then inserted into a data page for the target table. After the row is inserted, the RDBMS scans all indexes and updates the indexes one-by-one with the newly inserted rows in a serial mode. This process can be repeated until all the rows are inserted into data pages and all indexes are updated.

In various examples, the BULK insert operation combines many repeated operations such as: resource allocation; writing rows to disk; and applying an index row into multiple indexes serially (e.g., one index at a time) corresponding to a data row and reducing the frequency of these operations while in the SERIAL mode. BULK insert can yield better query execution performance in some instances as discussed in this disclosure.

In order to unconditionally apply BULK insert and parallel index for specific queries, a signal indicating to use the BULK mode can be transmitted to the database server. Thus, in various examples, the BULK insert and parallel index is not unconditionally applied to each query but can be made at run-time.

During execution of a database query in which rows are being inserted from a base table into a target table, rows from the base table can be accumulated into row buffers the size of a data page. When there are enough rows to fill a pre-defined number of pages, the RDBMS can automatically convert from a non-bulk insert mode into a BULK insert mode. The BULK insert can then be used to insert all the accumulated data rows in the row buffers to data pages and update the indexes in parallel mode.

For the remainder of the query execution, all additional rows from the base table can be accumulated and inserted under BULK mode. If enough pages of rows are not accumulated, the accumulated row data can still be inserted row-by-row into data pages and the indexes updated in serial mode. More details of the process are described with respect to FIGS. 1-4.

Additionally, buffering the rows into row buffers the size of a data page to make the run-time decision does not incur a memory cost with respect to the non-BULK insert mode. As discussed above, in a non-BULK insert mode, a row is copied to buffer the size of a row before being written to disk (e.g., on a data page for the table). Using the run-time decision process above, the row is buffered to a row buffer the size of a data page. Because in both cases the row is copied, there is no extra data being copied.

Figure 1:
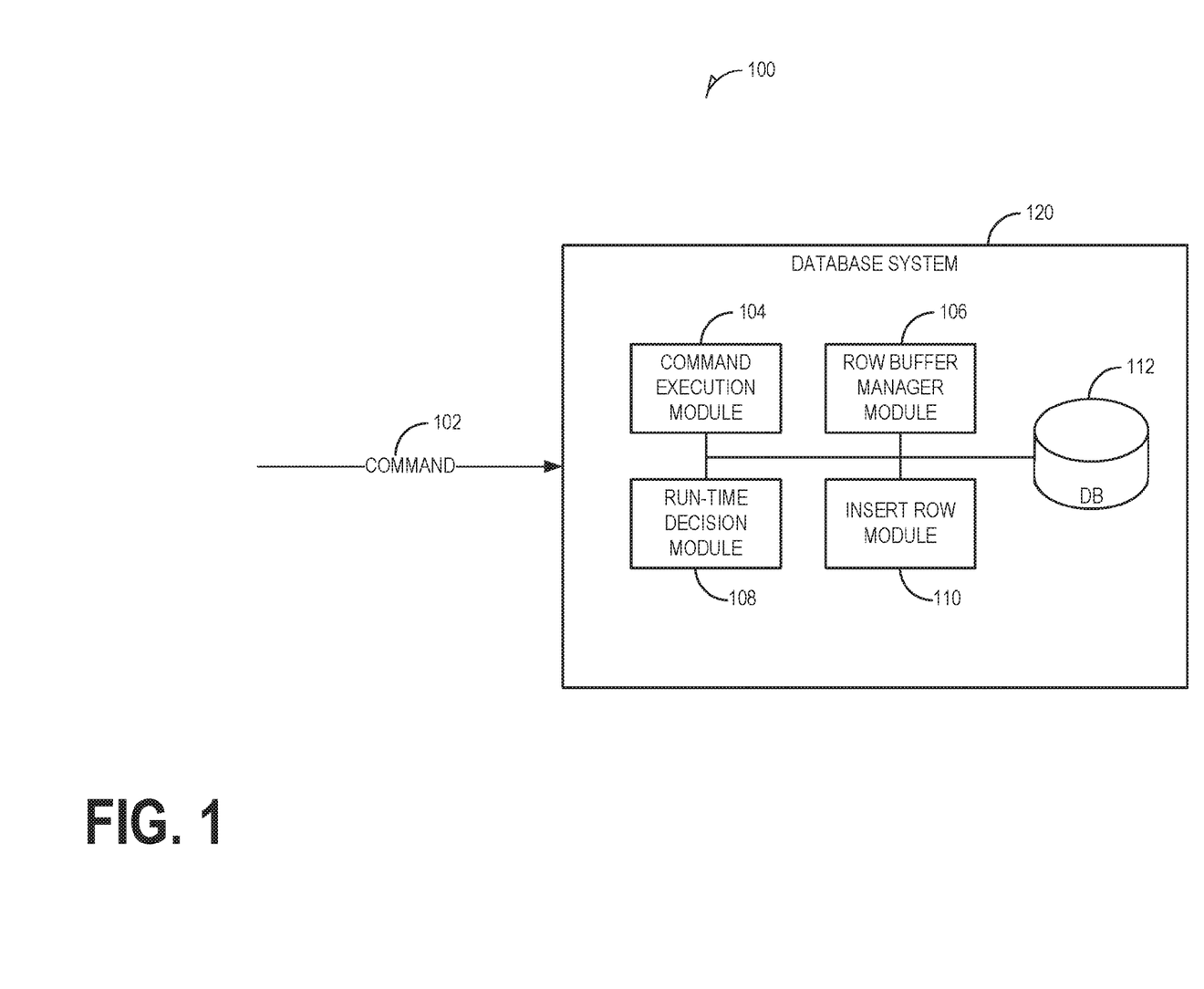
FIG. 1 illustrates system components, according to an example embodiment, used to convert a non-bulk insert mode to BULK insert mode, according to an example embodiment.

FIG. 1 illustrates system 100 including components used to convert a non-bulk insert mode to BULK insert mode, in an example embodiment. System 100 includes database system 120. Database system 120 includes a command execution module 104, a row buffer manager module 106, a run-time decision module 108, an insert row module 110, and database 112. In an example, the database system 120 is a RDBMS. Database system 120 can include one or more computing devices (e.g., hardware storage devices, processing units) to host and run the components and modules illustrated in the database system 120. The database 112 can be hosted by one or more servers (e.g., a network connected computing device including one or more processors).

In an example embodiment, the database system 120 receives a command 102 from a user. For example, a user can log in to the database system 120 and input the command 102 via a command line or graphical user interface (GUI). In an example, the command 102 can be initiated via an automated process (e.g., application code running on a website to insert data into the database 112). The command 102 can be, for example, an INSERT command for inserting data from a base table in database 112 to a target table in database 112. The INSERT command can specify both the base table and target table. Examples of the INSERT command can be, but are not limited to:

INSERT INTO . . . SELECT
SELECT INTO,
Batch insert
MERGE . . . INTO statements

The command execution module 104 can determine whether the command 102 is a query type that is suitable for using a BULK insert mode and can begin execution of the command 102. For example, some query types can not be suitable for use with BULK insert because the query types are not for inserting multiple rows of data into a target table or would not benefit from bulk loading of data (e.g., TRIGGER statements). A list of feasible commands can be stored in a data store in the database system 120 and checked by the command execution module 104 to determine if use of a BULK insert mode is feasible for the command 102. In an example, the feasibility indication can be received at the command execution module 104 from a separate module in the database system 120. The list of feasible commands can include, for example, and is not limited to, INSERT INTO . . . SELECT, SELECT INTO, Batch insert, MERGE . . . INTO statements, etc.

In an example embodiment, the row buffer manager module 106 controls the allocating and loading of row buffers. The row buffer manager module 106 can allocate memory of the database system 120 as row buffers. In an example embodiment, the row buffer manager module 106 allocates row buffers, such that the size of each row buffer is the same as the size of one data page of the target table. A benefit of equating the size of one row buffer to the size of one data page of the target table is to simulate inserting a data row into a data page. By using row buffers to simulate data pages, the database system 120 can simulate the number of pages being inserted into a target table for a query (e.g., command 102).

Figure 2:
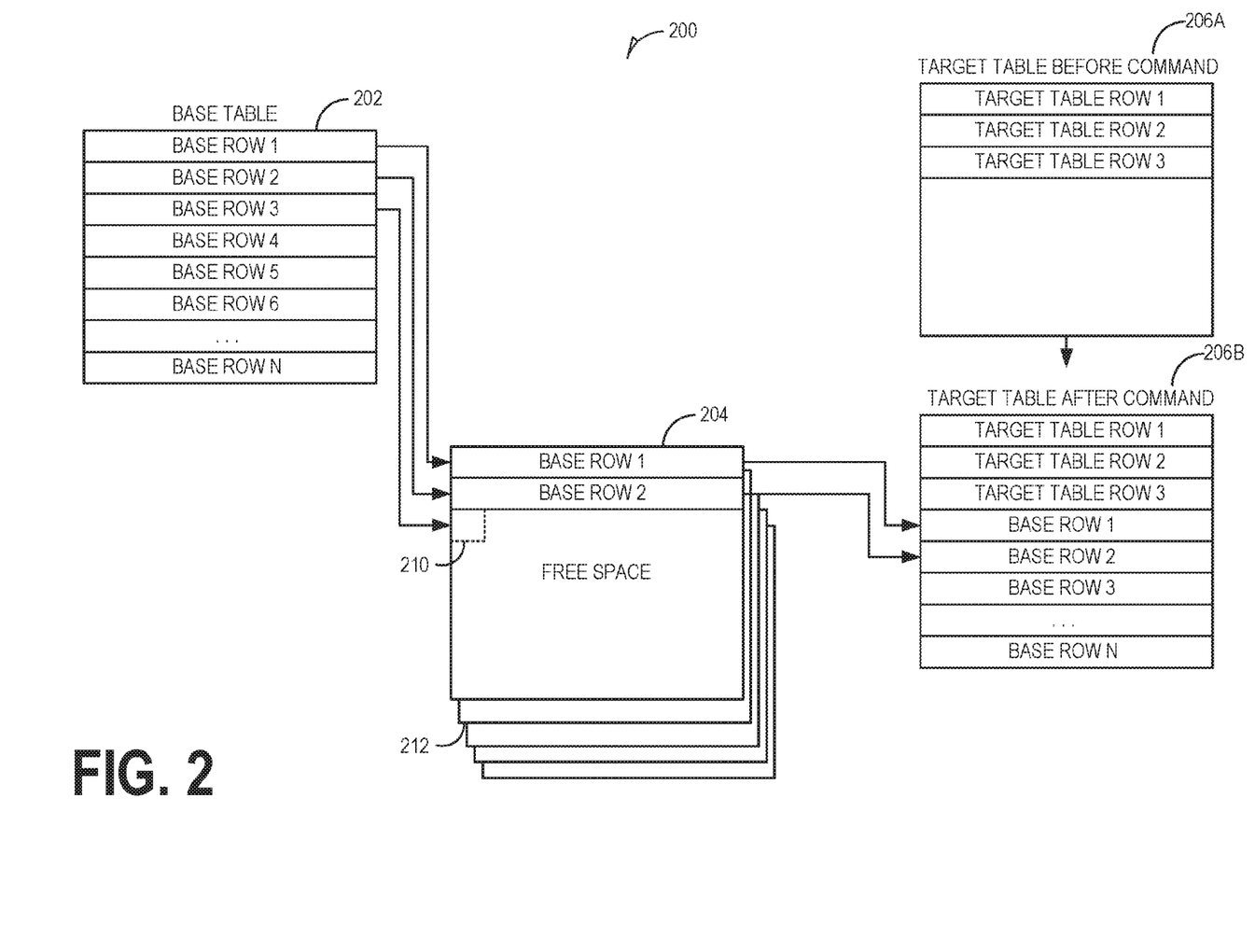
FIG. 2 is a visualization of a MERGE command, according to an example embodiment.

In an example embodiment, FIG. 2 is a visualization 200 of a MERGE command using row buffers. Visualization 200 includes a base table 202, row buffer 204, row buffer 212, a target table 206A, and the updated target table 206B, and free space 210. There can be more than one row buffer. In an example embodiment, the MERGE command (e.g., the command 102 in FIG. 1) is a query to merge data rows from base table 202 into the target table 206. The target table 206A includes rows before the MERGE command is executed. As shown, the target table 206A does not include any rows from the base table 202. The updated target table 206B includes rows as a result of executing the MERGE command. For example, the updated target table 206B includes rows from the base table 202.

In an example embodiment, assuming an indication has been received that a BULK insert mode is feasible for the MERGE command, a row can be retrieved from the base table 202 and built into the row buffer 204. As illustrated, "Base Row 1" and "Base Row 2" have already been built into the row buffer 204. As the MERGE command continues execution, "Base Row 3" will be built into the row buffer 204 at the beginning of the free space 210 of the row buffer 204. As execution of the MERGE command continues, rows from the base table 202 continue to be built into the row buffer 204 until the row buffer 204 is full. If the row buffer 204 is full, for example, there is no free space 210 in the corresponding row buffer 204, and assuming there are rows remaining to be read from the base table 202, the row buffer manager module 106 can allocate one or more additional row buffers (e.g., row buffer 212) for the remaining rows to be read from the base table 202. The row buffer manager module 106 can allocate additional row buffers until all of the rows (e.g., Base Row 1-Base Row N) from the base table 202, which are to be merged with the target table 206, are built into row buffers (e.g., row buffers 204, 212, etc.).

In an example, the result of inserting the rows from the row buffers 204, 212 is illustrated in the target table 206B. Whether or not a BULK insert mode or non-BULK insert mode is used for inserting the rows from the row buffers 204, 212 into the target table 206 depends on the number of row buffers (e.g., row buffers 204, 212) that are filled before all of the rows of the base table 202 are read, according to an example.

Referring back to FIG. 1, run-time decision module 108 can determine whether to use a BULK insert mode or a non-BULK insert mode for inserting the rows from the row buffers 204,212 into the target table 206A. The run-time decision module 108 can make a run-time adaptive decision based on run-time statistics of whether to use a BULK insert mode or non-BULK insert mode. In an embodiment, when the run-time decision module 108 detects the loading of bulk data, the run-time decision module 108 automatically determines to use BULK insert to load data (e.g., rows of data) without any user (e.g., system administrator) involvement. The run-time decision module 108 can detect the loading of bulk data based on run-time statistics. In an example embodiment, one such run-time statistic is the number of row buffers that are full. A row buffer can be determined to be full, for example, when there is no free space in the row buffer. In another example, a row buffer can be determined to be full when a pre-defined amount of free space remains in the row buffer. The pre-defined amount can be configurable and/or user (e.g., system administrator) defined. The run-time decision module 108 can determine the number of full row buffers, and based on the number, make a decision as to which insert mode to use. For example, the database system 120 can have a stored setting indicating a threshold (e.g., number of full row buffers) to be used to determine whether to use a BULK insert mode or a non-BULK insert mode. In an example embodiment, where a row buffer simulates a data page, the threshold number is eight row buffers, which simulate eight data pages.

In an example embodiment, the insert row module 110 inserts the rows in the database 112 in response to the command 102 using the insert mode determined by the run-time decision module 108. For example, if the determination is to use a BULK insert mode, the insert row module 110 can set up a BULK insert mode. Setting up the BULK insert mode can include allocating resources for the BULK insert. Examples of resources can include, and are not limited to, extents. A block of 8 pages is called an extent. For example, the insert row module 110 can allocate thirty-two extents, each of which contains eight data pages and the same number of threads as number of indexes. In an example embodiment, the insert row module 110 cleans up data structures and processes used during the BULK insert operation. For example, the insert row module 110 can release memory, delete unused data pages, remove threads, etc.

Figure 3:
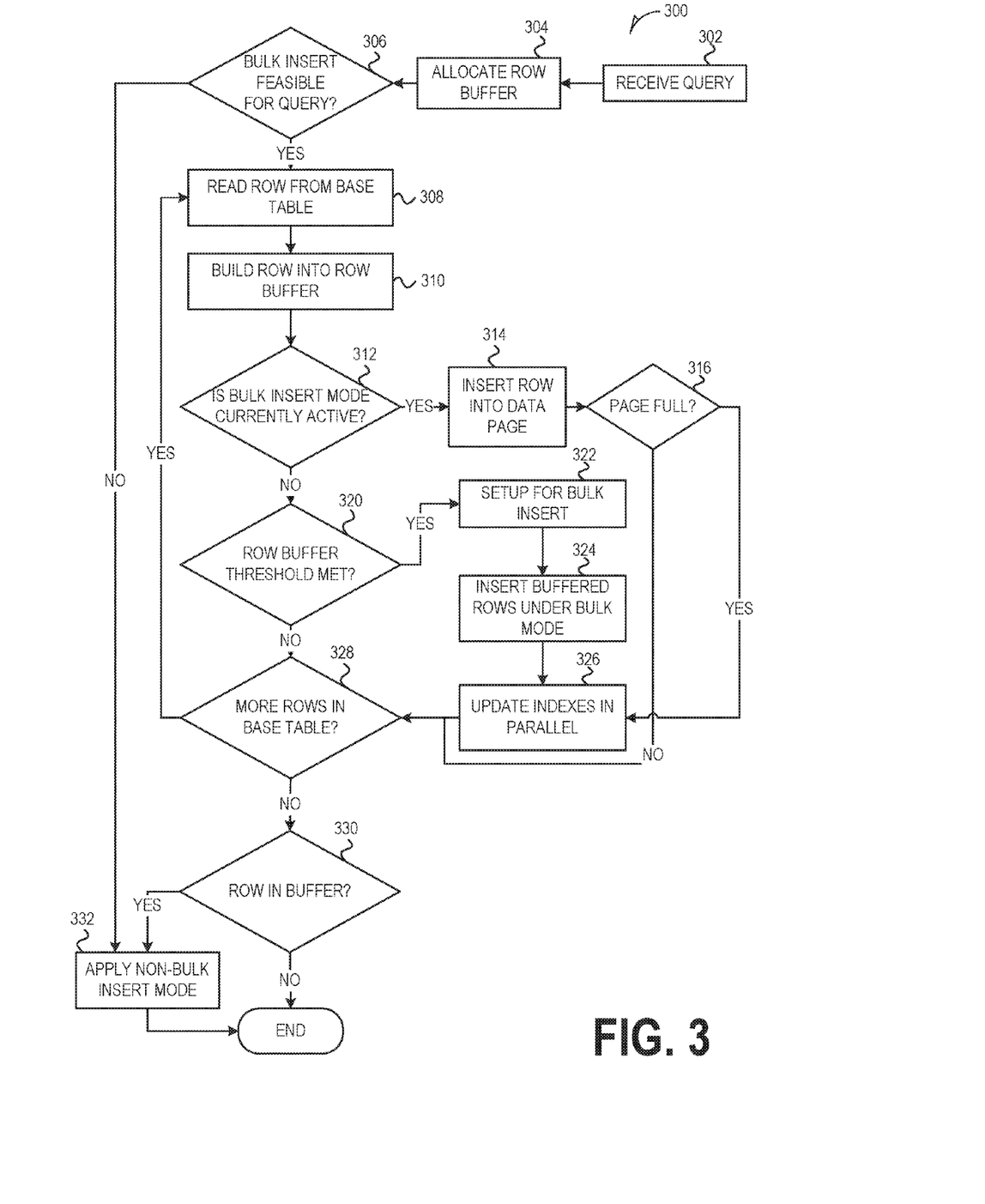
FIG. 3 is a flow chart illustrating a method, in accordance with an example embodiment, to convert a non-BULK insert to a BULK insert for inserting rows into a table of a database.

FIG. 3 is a flow chart illustrating a method 300, in accordance with an example embodiment, to convert a non-BULK insert to a BULK insert for inserting rows into a table of a database. The method 300 can be performed by processing logic that can comprise hardware (e.g., circuitry, dedicated logic, programmable logic, microcode, hardware modules etc.), software (e.g., instructions run on a processing device, software modules), or a combination thereof. In one implementation, the method 300 is performed by the system illustrated in FIG. 1, as described above.

In an example embodiment, not illustrated in the method 300, execution of a command begins. In an example embodiment, the command is an INSERT command that is an SQL query of the types discussed herein in which entire rows, or parts of rows, are copied or inserted from a base table into a target table.

In an example, at operation 302, a query (e.g., a database command) is received (e.g., at a database system) and at operation 304 a row buffer is allocated. The query can identify a base table and a target table. In an example, a row buffer manager can allocate the row buffer the size of a data page of the target table. In an example embodiment, at decision block 306, a determination is made as to whether or not a BULK insert mode is feasible for the received query.

For example, an indication can be received by a command execution module indicating the feasibility of using the BULK insert mode. The determination can be based on the query type. For example, an INSERT command can be classified as feasible for using the BULK insert mode, whereas a TRIGGER statement can be classified as not feasible for using the BULK insert mode. If it is determined that BULK insert is not feasible for the query, a non-BULK insert mode operation can be performed (operation 332) to copy or insert any rows from the base table to the target table. Similarly, if there are rows remaining in row buffers after the rows have been read from the target table and the indication is received that a command is not feasible (or that the query has not been converted to a BULK insert mode) the rows in the buffer can be inserted using a non-BULK insert mode.

At operation 308, a row is read from the base and table and at operation 310, the read row is built into the allocated row buffer, in an example embodiment. An example method to build a row into an allocated row buffer are discussed further with respect to FIG. 4.

In an example embodiment, if it is determined that BULK insert mode is already active (decision 312), the row can be inserted into the target table using the BULK insert mode at operation 314. The determination can be based on a variable value stored in the database system. The inserting can include writing the row into a data page for the target table. At decision block 316, a determination is made as to whether the data page is full. If the data page is full, at least two indexes for the target table are updated in parallel with inserting the row at operation 326.

In an example embodiment, a run-time decision can be made to determine if the BULK insert mode should be used when it is determined at operation 312 that a BULK insert mode is not currently active. For example, it can then be determined if enough rows have been buffered to convert the current operation to use a BULK insert mode (see decision block 320). If a threshold number of full row buffers has been reached, the BULK insert mode can be set up at operation 322. In an example embodiment, the threshold is a number of buffered rows.

In an example embodiment, setting up BULK insert mode includes generating the extents and index update threads discussed previously related to using a BULK insert mode. Then, currently buffered rows are inserted into the target table under the BULK insert mode (operation 324) and at least two indexes are updated in parallel with the inserting at operation 326.

At this point, processing can continue using bulk insert processing and after command execution is complete, the insert processing can be cleaned up. For example, after the BULK insert mode has been set up, an indication can be stored indicating that a non-BULK insert mode has been converted to a BULK insert mode. If the threshold number of rows is not reached and there are no rows remaining to be read from the base table, then all buffered rows are inserted using the non-BULK insert mode and indexes updated in serial (operation 332).

At decision block 328, a determination is made as to whether there are more rows in the base table remaining to be read. If there is a row in the base table (decision block 328), flow reverts back to operation 308 to read the row in the base table. If it determined that there are no more rows in the base table a determination is made if there are rows remaining in one or more buffers (decision block 330). If there are rows in the buffers, the buffered rows are inserted in the non-BULK insert mode at operation 332, and indexes are updated in the serial mode.

Figure 4:
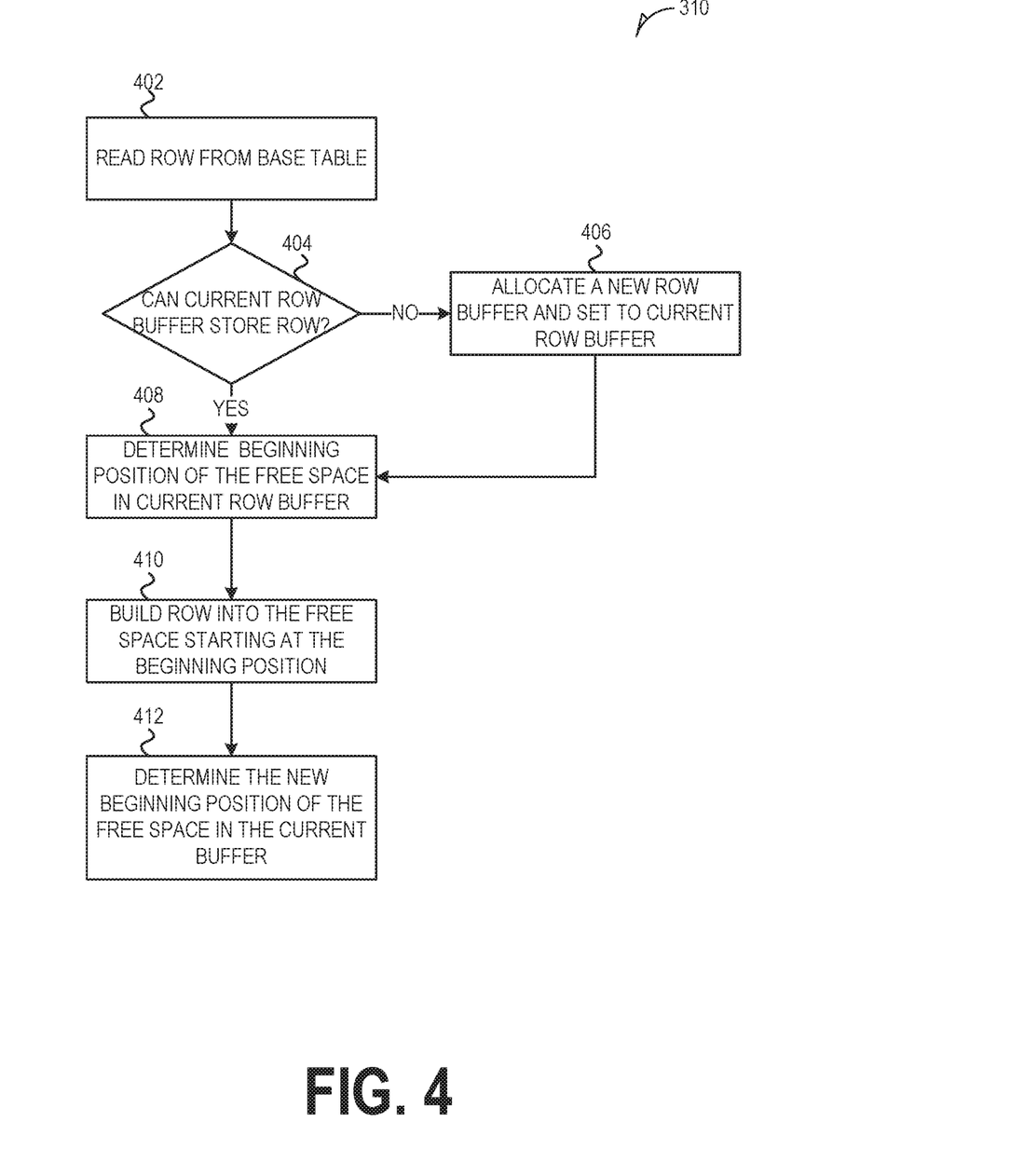
FIG. 4 is a flow chart illustrating a method, in accordance with an example embodiment, to build rows into a row buffer.

FIG. 4 is a flow chart illustrating a method 310, in accordance with an example embodiment, to build rows into a row buffer. The method 310 can be performed by processing logic that can comprise hardware (e.g., circuitry, dedicated logic, programmable logic, microcode, hardware modules etc.), software (e.g., instructions run on a processing device, software modules), or a combination thereof. In one implementation, the method 310 is performed by the system illustrated in FIG. 1, as described above.

In an example embodiment, a row is read from the base table (see operation 402). In an example embodiment, the rows are read sequentially from the base table. It is then determined at decision block 404 if the current row buffer can store the read row. A comparison can be made between the size of the read row and the amount of free space left in the row buffer to make the determination. If the current row buffer does not have enough remaining free space, then at operation 406 a new row buffer can be allocated and the current row buffer can be set to the new row buffer.

In an example embodiment, if there is enough space in the current row buffer, the beginning position (e.g., offset or memory address) of the free space in the current row buffer is determined at operation 408. For example, a variable can store the position, or the position of the free space can be stored in the row buffer itself (e.g., in a header or the end of the row buffer). In an example embodiment, the read row is built into the row buffer starting at the determined beginning position (see operation 410). In an example embodiment, after the row is built into the current row buffer, the new beginning position of the free space is determined (e.g., calculated) at operation 412, which can be used for the next row that is read from the base table.

Example Computer System

Embodiments can be implemented in one or a combination of hardware, firmware, and software. Embodiments can also be implemented as instructions stored on a machine-readable storage device, which can be read and executed by at least one processor to perform the operations described herein. A machine-readable storage device can include any non-transitory mechanism for storing information in a form readable by a machine (e.g., a computer). For example, a machine-readable storage device can include read-only memory (ROM), RAM, magnetic disk storage media, optical storage media, flash-memory devices, and other storage devices and media.

Examples, as described herein, can include, or can operate on, logic or a number of components, modules, or mechanisms. Modules can be hardware, software, or firmware communicatively coupled to one or more processors in order to carry out the operations described herein. Modules can be hardware modules, and as such modules can be considered tangible entities capable of performing specified operations and can be configured or arranged in a certain manner. In an example embodiment, circuits can be arranged (e.g., internally or with respect to external entities such as other circuits) in a specified manner as a module. In an example embodiment, the whole or part of one or more computer systems (e.g., a standalone, client or server computer system) or one or more hardware processors can be configured by firmware or software (e.g., instructions, an application portion, or an application) as a module that operates to perform specified operations. In an example embodiment, the software can reside on a machine-readable medium. In an example embodiment, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor can be configured as respective different modules at different times. Software can accordingly configure a hardware processor, for example, to constitute a particular module at one instance of time and to constitute a different module at a different instance of time. Modules can also be software or firmware modules, which operate to perform the methodologies described herein.

Figure 5:
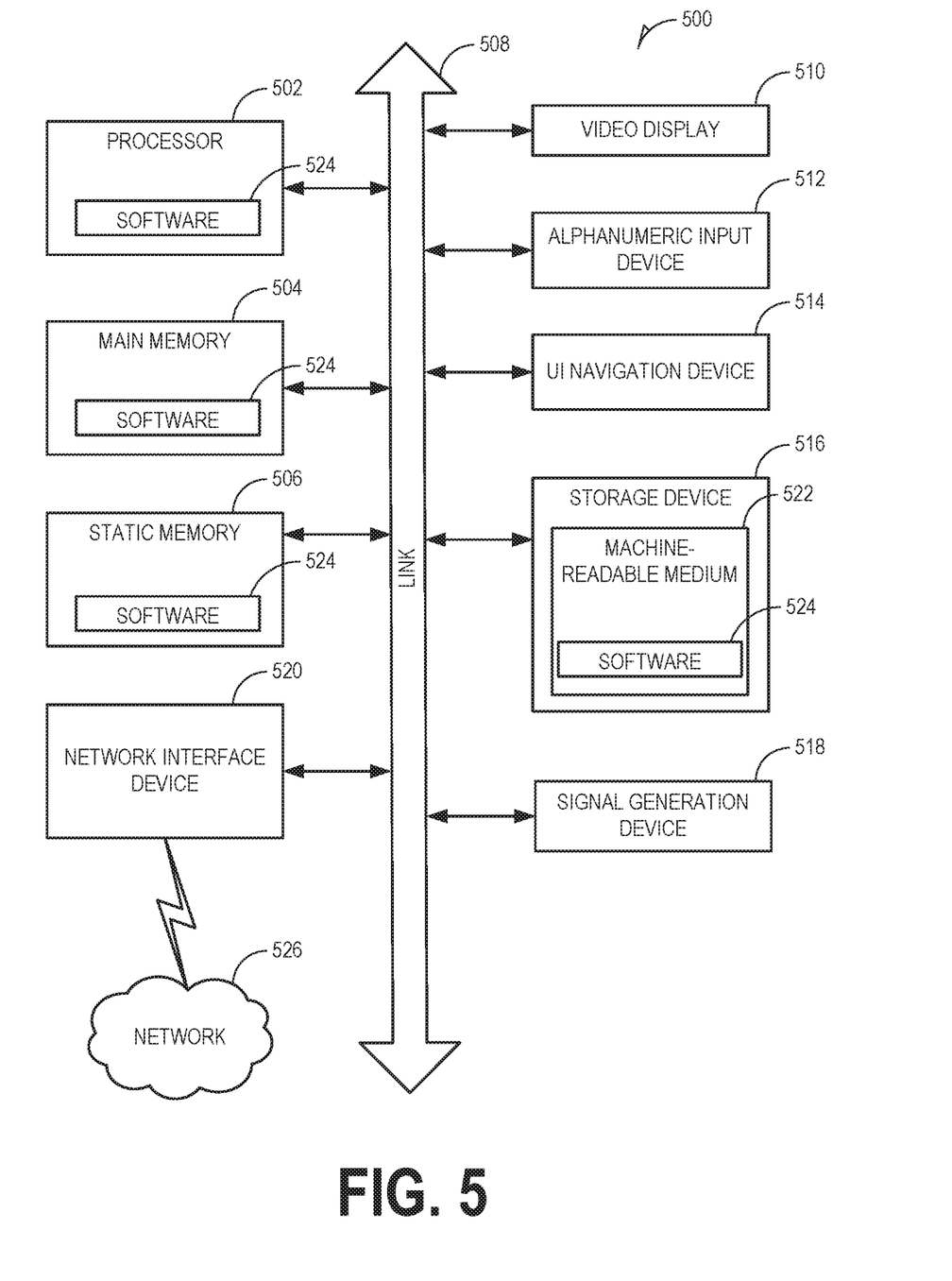
FIG. 5 is a block diagram illustrating a machine in the example form of a computer system, within which a set or sequence of instructions can be executed to cause the machine to perform any one of the methodologies discussed herein, according to an example embodiment.

FIG. 5 is a block diagram illustrating a machine in the example form of a computer system 500, within which a set or sequence of instructions can be executed to cause the machine to perform any one of the methodologies discussed herein, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes at least one processor 502 (e.g., a central processing unit (CPU), a graphics processing unit (GPU), or both, processor cores, computer nodes, etc.), a main memory 504 and a static memory 506, which communicate with each other via a link 508 (e.g., bus). The computer system 500 can further include a video display unit 510, an alphanumeric input device 512 (e.g., a keyboard), and a user interface (UI) navigation device 514 (e.g., a mouse). In one embodiment, the video display unit 510, input device 512, and UI navigation device 514 are incorporated into a touch screen display. The computer system 500 can additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" can include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 can further be transmitted or received over a communications network 526 using a transmission medium via the network interface device 520 utilizing any one of a number of well-known transfer protocols (e.g., Hypertext Transfer Protocol (HTTP)). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features can be grouped together to streamline the disclosure. However, the claims may not set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. Additionally, while the claims may recite "first row," "second row," and so forth, this is not intended to limit the scope to a literal ordering, but rather distinguishing between objects. The scope of the embodiments disclosed herein is to be determined with reference to the appended claims, along with the full scope of equivalents to which such claims are entitled.

What is claimed is:

1. A method comprising:
receiving a database command, the database command associated with a base table with at least one row to copy to a target table;
receiving an indication that use of a BULK insert mode is feasible for the database command, the feasibility determined based on one or more run-time statistics for at least one buffer indicating a threshold number of full row buffers;
based on the indication, converting from a non-bulk insert mode to the BULK insert mode by allocating resources including one or more extents, each extent comprising a block of pages, and one or more threads for index updating; and
based on determining that an insert mode for the database command has been converted from a non-bulk insert mode to the BULK insert mode:
reading a row from the base table;
building the row read from the base table into an allocated row buffer within a block of pages of an extent of the one or more extents; and
based on a determination that the allocated row buffer is full, inserting rows within the allocated row buffer into the target table in the BULK insert mode and updating at least one index in parallel with the inserting, the updating using at least one thread of the one or more threads.

2. The method of claim 1, further comprising:
beginning execution of a second database command, the second database command associated with the base table with at least one row to copy to the target table;
receiving an indication that the BULK insert mode is not feasible for the second database command;
based on the indication that the bulk insert mode is not feasible, building a row retrieved from the base table into a second allocated row buffer; and
inserting the second row into the target table in a non-BULK insert mode.

3. The method of claim 2, further comprising:
determining that there are no rows remaining in the base table to be read; and
inserting any remaining rows buffered in the second allocated row buffer in the non-bulk insert mode; and
updating, in a serial mode, at least one index.

4. The method of claim 1, wherein a row buffer manager allocates the allocated row buffer.

5. The method of claim 4, wherein the allocated row buffer is a same size as a data page of the target table.

6. The method of claim 1, further comprising:
allocating another row buffer.

7. The method of claim 6, further comprising:
reading a second row from the base table;
building the second row read from the base table into the another allocated row buffer;
based on determining that the another allocated buffer is not full, reading a third row from the base table.

8. The method of claim 7, further comprising:
determining that the base table contains two or more rows before reading the second row.

9. A system comprising:
one or more processors; and
a non-transitory computer-readable medium coupled to the one or more processors, the computer-readable medium comprising one or more modules, which when executed by the one or more processors, configure the one or more processors to perform one or more operations, the one or more modules including:
a command execution module configured to cause the one or more processors to:
initiate execution of a database command, the database command associated with a base table with at least one row to copy to a target table;

receive an indication that use of a BULK insert mode is feasible for the database command, the feasibility determined based on one or more run-time statistics for at least one buffer indicating a threshold number of full row buffers;

a row buffer manager module configured to cause the one or more processors to, based on the indication, and a determination that an insert mode for the database command has been converted from a non-bulk insert mode to the BULK insert mode:

read a row from the base table; and build the row read from the base table into an allocated row buffer within a block of pages of an extent of one or more extents; and an insert row module configured to cause the one or more processors to, based on the indication, convert from the non-bulk insert mode to the BULK insert mode by allocating resources including the one or more extents, each extent comprising a block of pages, and one or more threads for index updating, and based on a determination that the allocated row buffer is full:

insert rows within the allocated row buffer into the target table in the BULK insert mode; and update at least one index in parallel with the inserting, the updating using at least one thread of the one or more threads.

10. The system of claim 9, wherein:

the command execution module is configured to cause the one or more processors to:

begin execution of a second database command, the second database command associated with the base table with at least one row to copy to the target table; and receive an indication that the BULK insert mode is not feasible for the second database command;

the row buffer manager is configured to build a row retrieved from the base table into a second allocated row buffer based on the indication that the BULK insert mode is not feasible; and the insert row module is configured to insert the second row into the target table in a non-BULK insert mode.

11. The system of claim 10, wherein the command execution module is configured to cause the one or more processors to determine that there are no rows remaining in the base table to be read; and wherein the insert row module is configured to:

insert any remaining rows buffered in the second allocated row buffer in the non-bulk insert mode; and update, in a serial mode, at least one index.

12. The system of claim 9, wherein the row buffer manager module is configured to cause the one or more processors to allocate the allocated row buffer.

13. The system of claim 12, wherein the allocated row buffer is a same size as a data page of the target table.

14. The system of claim 12, where the row buffer manager module is configured to cause the one or more processors to allocate another row buffer when the allocated row buffer is full.

15. A non-transitory computer-readable medium comprising instructions, which when executed by at least one processor, configure the at least one processor to perform operations comprising:

initiating execution of a database command, the database command associated with a base table with at least one row to copy to a target table;

receiving an indication that use of a BULK insert mode is feasible for the database command, the feasibility determined based on one or more run-time statistics for at least one buffer indicating a threshold number of full row buffers;

based on the indication, converting from a non-bulk insert mode to the BULK insert mode by allocating resources including one or more extents, each extent comprising a block of pages, and one or more threads for index updating; and based on determining that an insert mode for the database command has been converted from a non-bulk insert mode to the BULK insert mode:

reading a row from the base table;

building the row read from the base table into an allocated row buffer within a block of pages of an extent of the one or more extents; and based on a determination that the allocated row buffer is full, inserting rows within the allocated row buffer into the target table in the BULK insert mode and updating at least one index in parallel with the inserting, the updating using at least one thread of the one or more threads.

16. The computer-readable medium of claim 15, the operations further comprising:

beginning execution of a second database command, the second database command associated with the base table with at least one row to copy to the target table;

receiving an indication that the BULK insert mode is not feasible for the second database command;

based on the indication that the bulk insert mode is not feasible, building a row retrieved from the base table into a second allocated row buffer; and inserting the second row into the target table in a non-BULK insert mode.

17. The computer-readable medium of claim 16, the operations further comprising:

determining that there are no rows remaining in the base table to be read; and inserting any remaining rows buffered in the second allocated row buffer in the non-bulk insert mode; and updating, in a serial mode, at least one index.

18. The computer-readable medium of claim 15, wherein a row buffer manager allocates the allocated row buffer.

19. The computer-readable medium of claim 18, wherein the allocated row buffer is a same size as a data page of the target table.

20. The computer-readable medium of claim 15, the operations further comprising:

allocating another row buffer.

* * * * *